United States Patent [19]

Tsubone et al.

[11] Patent Number: 4,734,304
[45] Date of Patent: Mar. 29, 1988

[54] HEAT-SHRINKABLE SHEET

[75] Inventors: Masahiro Tsubone; Keizo Ono, both of Koga; Tohimasa Ito, Sowa, all of Japan

[73] Assignee: Sekisui Kaseihin Kogyo Kabushiki Kaisha, Nara, Japan

[21] Appl. No.: 71,959

[22] Filed: Jul. 10, 1987

[30] Foreign Application Priority Data

Jul. 11, 1986 [JP] Japan .................. 60-164499

[51] Int. Cl.⁴ .............................. B32B 3/26
[52] U.S. Cl. .................... 428/35; 428/318.6; 428/318.8; 428/319.7; 428/319.9; 428/913
[58] Field of Search ............ 428/35, 318.6, 318.8, 428/319.7, 319.9, 913

[56] References Cited

U.S. PATENT DOCUMENTS 3,760,968  9/1973  Amberg et al. ................ 428/35
3,979,000  9/1976  Karabedian ................... 428/35
4,463,861  8/1984  Tsubone et al. ............... 428/35
4,626,455  12/1986 Karabedian .................. 428/318.6

FOREIGN PATENT DOCUMENTS 61-74837  4/1986  Japan ........................ 428/318.6

Primary Examiner—William J. Van Balen
Attorney, Agent, or Firm—Armstrong, Nikaido, Marmelstein & Kubovcik

[57] ABSTRACT

A heat-shrinkable sheet made of a foamed thermoplastic resin having a number of cells and which is adapted to cover a fragile container such as a glass bottle, is heat-shrunk so that said sheet can stick to the container. The cells of the sheet are burst, i.e., opened or collapsed, so that the surface of the sheet which contacts the surface of a container is formed in a convexo-concave surface, which facilitates the entry of boiling water or cooling water between the sheet and the surface of the container when the sheet is adhered to the container.

10 Claims, 9 Drawing Figures

HEAT-SHRINKABLE SHEET

BACKGROUND OF THE INVENTION

The present invention relates to a heat-shrinkable sheet, and more particularly to a heat-shrinkable sheet which is useful for covering and protecting fragile glass bottles or the like.

It is known to cover and protect fragile containers made of glass or the like for holding juice, a carbonated drink, a drink containing fruit juice, etc., with various types of heat-shrinkable foamed sheets (see U.S. Pat. No. 3,760,968 for example). Recently, there has been used a heat-shrinkable sheet excellent in printability and capable of preventing a container from scattering when the container is broken. The sheet has a laminated structure of a foamed sheet and a non-foamed film (see U.S. Pat. Nos. 3,979,000 and 4,463,861 for example).

Juice and drinks containing fruit juice require sterilization during bottling. Such sterilization is achieved according to a hot-fill method in which, after being sterilized by heat, the contents such as juice are sealed in a heated condition in a bottle and cooling water is then brought into contact with the bottle to cool the contents, or according to a cold-fill method in which the contents are sealed in a bottle in an ambient temperature and sterilized with heat by blowing boiling water, vapor or the like onto the bottle, and then contacting the bottle with cooling water to cool the contents.

The conventional heat-shrinkable foamed sheet above-mentioned having a smooth foamed surface is excellent in adiabatic ability (heat-insulating ability) and is used with the entire inner peripheral surface sticking, or adhering, to the bottle. Therefore, it is difficult for the boiling water or cooling water to penetrate between the bottle and the heatshrinkable foamed sheet and a long period of time is required for heating or cooling the contents after they are sealed in the bottle. This disadvantageously prevents efficient heat sterilization.

In view of the foregoing disadvantage, there is sometimes used a non-foamed heat-shrinkable film having a good thermal conductivity. However, such heat-shrinkable film lacks cushioning properties and does not provide sufficient protection of a bottle charged with contents. Such a film, therefore, is not suitable for a fragile container such as a glass bottle.

In order to adequately protect a fragile container such as a glass bottle and to achieve efficient heat sterilization, there has been proposed a heat-shrinkable sheet excellent both in cushioning properties and thermal conductivity. This heat-shrinkable sheet has a two-layer structure of a foamed layer and a non-foamed layer, the foamed layer having an internal structure (between the outermost surface of one side and the outermost surface of the other side) in which 1 to 50% of the cells is formed in a continuous cell structure (Unexamined Japanese Patent Publication 74837/1986).

In the heat-shrinkable sheet above-mentioned, as the percentage of the continuous cell structure of the foamed layer approaches 50%, the thermal conductivity is improved, but a large quantity of cooling water can penetrate the inside of the foamed layer and deteriorate the drying characteristics. If such a sheet as it is, is used on a container, there is a certain danger of mold growing to provide unhealthy conditions. On the contrary, as the continuous cell rate approaches 1%, the thermal conductivity is deteriorated, thus preventing efficient heat sterilization.

OBJECTS AND SUMMARY OF THE INVENTION

It is an object of the present invention to provide a heat-shrinkable sheet useful for covering a container, which enables efficient heating and cooling of contents of the container requiring heat sterilization, thereby minimizing the manufacturing cost of finished drink products.

It is another object of the invention to provide a hygienic heat-shrinkable sheet in which residual moisture after sterilization can be quickly removed to prevent mold from forming.

It is a further object of the invention to provide a heat-shrinkable sheet excellent in cushioning, or shock-absorbing, properties to give a good protective effect to a container.

In order to achieve the object above-mentioned, the heat-shrinkable sheet in accordance with the present invention is formed such that the surface of the foamed sheet which is to contact the surface of a container is made in a concavo-concave surface having convex and concave portions formed by opened cells or by opened cells and collapsed cells with the cells of the foam burst. This surface structure permits the entry of fluid between the foamed sheet and the container when the foamed sheet is adhered to and contacts and covers the container.

These and other objects of the invention will be better understood from a consideration of the following detailed description, taken in conjunction with the accompanying drawings.

DETAILED DESCRIPTION OF THE PREFERRED EMBODIMENTS

The following description describes in detail preferred embodiments of the invention with reference to the accompanying drawings.

Figure 1:
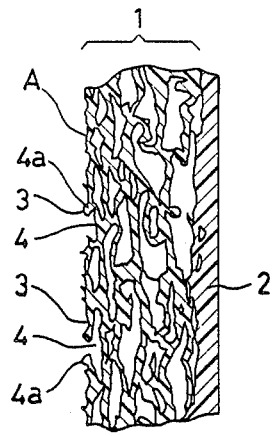
FIG. 1 is a section view taken along the line I—I in FIG. 2.

As shown in FIG. 1, the heat-shrinkable sheet according to the present invention has a foamed surface A on at least one side thereof. The heat-shrinkable sheet may be a single thermoplastic resin formed sheet 1 alone having a foamed surface A on at least one side thereof, or a laminated sheet of two or more layers including such a foamed sheet 1 and a non-foamed film 2 laminated thereon.

As the material for the foamed sheet 1, there may be used any of the well-known resins generally used for a foamed sheet, such as (a) an olefin-type polymer including polyethylene, polypropylene and the like, (b) polyvinyl chloride, (c) polycarbonate and (d) polystyrene polymers. Of these, it is preferable to use, in view of ease of production, (a) a homopolymer of an aromatic vinyl monomer such as polystyrene and (b) a copolymer which is obtained by the copolymerization of an aromatic vinyl monomer with another monomer, such as high impact polystyrene, ABS resin and the like.

Examples of useful aromatic vinyl monomers include styrene, vinyltoluene, isopropylstyrene, α-methylstyrene, chlorostyrene, tert-butylstyrene and the like.

Examples of the monomer copolymerizable with the aromatic vinyl monomer include (a) butadiene, (b) methacrylate ester or acryl ester including ethyl acrylate, butyl acrylate, 2-ethylhexyl acrylate, methyl methacrylate, ethyl methacrylate, butyl methacrylate and 2-ethylhexyl methacrylate, (c) acrylonitrile, (d) vinyl acetate, (e) divinylbenzene and (f) maleate such as dimethyl maleate and diethyl maleate and other monomers known in the art to be copolymerizable with aromatic vinyl monomers.

In addition to the polystyrene polymers described above, other examples of materials useful for the foamed sheet 1, in view of ease of production, are polyethyrene or polypropylene. When the material of the foamed sheet 1 is a rigid material such as a polystyrene polymer or polyvinyl chloride, the materials may contain a rubber component, e.g., (a) natural rubber, (b) synthetic rubber such as styrene-butadiene rubber, butadiene rubber, butyl rubber and acryl rubber and (c) synthetic resin having stretching properties such as vinyl acetate copolymer and an etylene-vinyl acetate copolymer. Such a rubber component may be contained in a range from 1% to 40% by weight and, preferably, 1% to 10% by weight, based on the total weight of the material.

When the rubber component above-mentioned is used in an amount of 1% or less by weight, the flexibility and impact-resistance may be insufficient. On the other hand, when the amount of the rubber component exceeds 40% by weight, the stretching properties may be insufficient. A foamed sheet containing the above-described rubber component has good flexibility and impact-resistance, and can be readily subjected to a stretching operation to be discussed later.

Examples of foaming agents useful for forming the foamed sheet 1 include (a) an azo compound such as azodicarbonamide, (b) an azide compound such as terephthalic azide, (c) sodium bicarbonate, (d) citric acid, (e) carbon dioxide gas, (f) a hydrocarbon such as methane, propane and butane, (g) a hydrocarbon fluoride such as trichloromonofluoromethane, dichlorodifluoromethane, dichloromonofluoromethane, monochloromonofluoromethane, monochlorodifluoromethane, monochloro-1,2,2,2-tetrafluoroethane, 1,1,1,2-tetrafluoroethane, 1,1,1,2-tetrafluoromethane, 1-chloro-1,1 difluoroethane, 1,1-difluoroethane, and (h) low boiling point liquids or gases of the ester-type or ketone-type.

One or more foaming agents above-mentioned can be used in an amount according to the desired forming degree, or expansion ratio, for example in a range from 0.1% to 5% by weight based on the total amount of the thermoplastic resins, foaming agents and other possible constituents of the foamed sheet.

Further, the foamed sheet 1 may include (a) a foaming core forming (nucleating) agent such as talc or kaolin, (b) a deterioration preventive agent such as an antioxidizing agent or a ultraviolet absorber, and (c) additives such as plasticizers, colorants or lubricants.

The expansion ratio of the foamed sheet 1 may be suitably selected such that the container can be protected with good cushioning properties, container pieces can be prevented from scattering if the container is broken, and a good adiabatic ability can be obtained. For example, the expansion ratio is in the range from 2 to 40 times, preferably in a range from 4 to 12 times. The cushioning, or shock-absorbing properties may be insufficient when the expansion ratio is less than 2 times, while the mechanical strength may be insufficient with an expansion ratio of 40 times or more.

The heat-shrinkable sheet shrunk by heat in the diametrical direction is generally used.

It is, therefore, preferable to arrange the heat-shrinkage factor of the heat-shrinkable sheet such that heating at 130° C. for 15 seconds produces heat shrinkage of 35% or more in one direction, i.e., in the circumferential direction of a container, as well as heat shrinkage of 10% or less in the direction perpendicular to said one direction, i.e., in the axial direction of the container. With a heat shrinkage factor of less than 35% in said one direction, the shrink packaging may be deteriorated in accuracy and require a lot of time. When the heat shrinkage factor in the direction perpendicular to said one direction exceeds 10%, the shrinkage in the axial direction of a container is increased, thus rendering it difficult to position a shrink film in the axial direction at the time of heat shrinkage.

When a heat-shrinkable sheet including the foamed sheet 1 and the film 2 laminated on one side thereof is used the shrinkage of the heat-shrinkable sheet may be achieved by heat-shrinking both the film 2 and the foamed sheet 1, or by heat-shrinking the foamed sheet 1 only.

Examples of the material of the film 2 to be laminated on the foamed sheet 1 include resins or all types including polyethylene, polypropylene, polyethylene terephthalate, nylon, polycarbonate and the polystyrene-type polymers above-mentioned. The lamination of such a film 2 will give good appearance and a better printability, as well as other various characteristics, to the heat-shrinkable sheet.

In the heat-shrinkable sheet, the foamed surface A of the foamed sheet 1 which will come in contact with a container such as a glass bottle, has convex and concave portions formed by opened cells or by opened cells and collapsed cells of the foamed sheet 1. Thus, the surface A becomes an uneven or rough surface in a close or microscopic observation (see FIG. 1, and FIGS. 4 to 7). Provision of such a convexo-concave surface facilitates the entry of boiling or cooling water between the foamed surface A and the surface of the container when the heat-shrinkable sheet adheringly contacts the container. Such liquid entry enables quick heating and cooling of the container. The concave portions 4 of the surface A are formed in a discontinuous manner by bursting the cells in the surface A, and are different from straight grooves extending from one end to the other end of the foamed sheet 1. The electron microscopic photographs attached show a heat-shrinkable sheet where a non-foamed film of 65 μm thick is laminated on a 120 μm-thick polystyrene foamed sheet having an expansion ratio of 45. A numeral on the left end under a black-solid line which exists at the bottom right of the photograph shows the length (micron) of the black-solid line.

Figure 8:
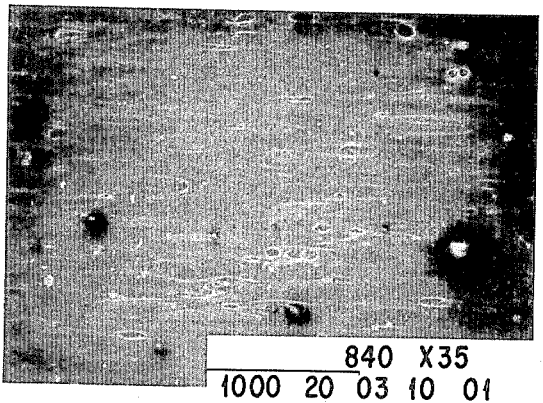
Figure 9:
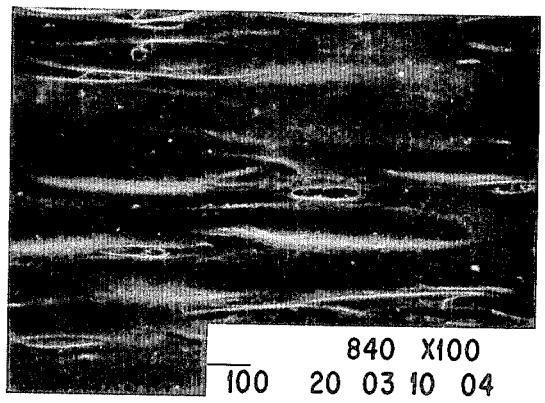

The cells may be burst, for example by extruding the foamed sheet 1 from metallic molds with the temperature of the surface of the foamed sheet 1 maintained at 170° C. or more and, preferably, in a range from 175° to 230° C. so that a cell wall 3 of the sheet surface is opened due to the cell inner pressure. When the cells are burst in this manner, the opening edges 4a of the concave portions 4 are raised, thus causing the surface A to be more coarsely convexo-concave. This further facilitates the entry of a liquid such as boiling water between the foamed sheet 1 and the container. Besides the concave portions 4 mainly formed with the opened cells in the above-mentioned process, some concave portions 4 may be formed with the cell wall 3 collapsing inwardly at the temperature of 170° C. or more, as shown in FIGS. 8 and 9.

Preferably, there exist two or more concave portions 4 in any 1 mm², where the average of the longitudinal size L1 and the widthwise size L2 of each portion 4 is in a range from 50 μm or more to 600 μm or less i.e., $$50 \ \mu m \leq \frac{L_1 + L_2}{2} \leq 600 \ \mu m$$

Figure 2:
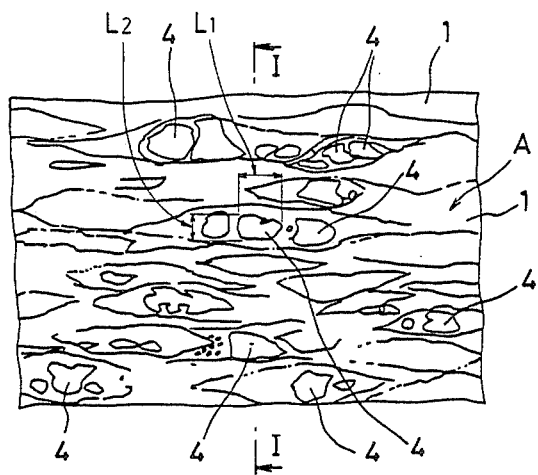
FIG. 2 is an enlarged view showing the surface of a heat-shrinkable sheet in accordance with the present invention.

(see FIG. 2). When the average exceeds 600 μm, it becomes difficult to ensure the strength of the heat-shrinkable sheet. Less than two concave portions 4 per 1 mm² will require a long period of time to remove moisture from the concave portions 4 when the contents in a container are sterilized by boiling water.

The entire thickness of the heat-shrinkable sheet is preferably in a range from 80 to 200 μm. The cushioning properties may be insufficient with a sheet thickness less than 80 μm. When the thickness exceeds 200 μm, the heat-shrinkable sheet may be easily torn when a container closely covered with the heat-shrinkable sheet is washed.

In the foamed sheet 1, the average number of cells in the thickness direction is preferably in a range from 3 to 15. When the number of cells in the thickness direction is less than 3, the cushioning properties of the heat-shrinkable sheet are decreased and leads to poor printability of the surface of the foamed sheet 1 or the film 2. On the other hand, when the number of cells in the thickness direction exceeds 15, the sizes of the cells become small due to the limited thickness of the heat-shrinkable sheet, thus causing difficulty in stretching of the sheet.

The following description is a method of manufacturing the heat-shrinkable sheet in accordance with the present invention.

With the use of a circular die, the heat-shrinkable sheet may be manufactured with a plug method, an inflation method or a T-die method suitably selected.

That is, a composition comprising the material of the foamed sheet 1 and a foaming agent or the like is extruded and foamed in the shape of a sheet according to a conventional method. In order to give heat-shrinkability to the sheet, the sheet is stretched in the extruding direction and in a direction at right angles thereto simultaneously with the extrusion, and is further stretched in the extruding direction of the sheet. The stretching magnification is determined such that the desired shrinkage factors of the heat-shrinkable sheet mentioned earlier are obtained. The sheet may be stretched generally in one or two directions according to a suitable method known per se, such as a pin tenter method, a clip tenter method or a roll stretching method.

For obtaining a multi-layer heat-shrinkable sheet, the foamed sheet 1 and the non-foamed or foamed film 2 may be laminated on each other with the use of adhesives of the solution type or the hot melt type, e.g., an ethylene-vinyl acetate copolymer or the like. The foamed sheet 1 and the film 2 may be molten and co-extruded so that the foamed sheet 1 and the film 2 are laminated in a melted condition.

In a heat-shrinkable sheet including the foamed sheet 1 and the film 2 laminated thereon, the film 2 previously stretched to produce shrinkability may be laminated on the foamed sheet 1 which has been stretched. After lamination, the film 2 may be stretched together with the foamed sheet 1. Without being subjected to previous stretching, the film 2 may be laminated on the foamed sheet 1.

In order to burst the cells in the foamed surface A of the heat-shrinkable sheet, causing the foamed surface A to form a convexo-concave surface, the foamed sheet 1 may be extruded and foamed with the temperature set at a temperature at which the independent cells in the foamed surface A burst. This temperature depends on the type of material of the foamed sheet 1, for example 170° C. or more for the polymers of aromatic vinyl monomers mentioned earlier. It is noted, however, that the temperature at which the independent cells in the foamed surface A are burst, also varies with the foaming agent to be used. Generally, as the extrusion temperature is increased, the number of cells which burst is increased. A foaming agent, such as carbon dioxide gas, hydrogen, Freon 11, Freon 12, having little compatibility with respect to polysthyrene may easily burst the cells without deteriorating the appearance of the foamed sheet 1.

In order to burst the cells, there may be also adopted another method according to which regular or irregular wounds are inflicted on the foamed surface A with a cutter or sand paper, these wounds being formed in various sizes and shapes such as points or strips.

A container may be tightly covered with the heat-shrinkable sheet thus obtained by heat-shrinking the sheet 1 with the foamed surface A applied to the surface of the container, with the use of heating means of far infrared rays or hot air. When a container such as a bottle is covered with the heat-shrinkable sheet, gaps are formed between the foamed surface A and the container due to the presence of the concave portions 4 of the foamed surface A, thus facilitating the entry of boiling water or cooling water between the container and the foamed surface A. Therefore, the container can be efficiently heated and cooled. Further, the cushioning properties of the foamed sheet 1 protect the container against impact.

The heat-shrinkable sheet in accordance with the present invention may be applied to various uses such as packing of food cartons, stack-packing of canned foods, packing of precision machine parts, and packing of electronic parts. In particular, the heat-shrinkable sheet is advantageously used for containers containing drinks manufactured using heating and cooling steps.

The heat-shrinkable sheet in accordance with the present invention is not limited to the embodiments discussed hereinbefore. For example, the foamed sheet 1 may be made in any form as far as at least the foamed surface A which is adapted to come in contact with a container has a convexo-concave surface. The concave portions 4 may communicate with one another in the inside of the foamed sheet 1. The burst cells may communicate with cells adjacent these burst cells in the thickness direction. The film 2 laminated on the foamed sheet 1 may be made of material identical to or different from that of the foamed sheet 1.

The following description will discuss in more detail examples of the invention.

With the use of an extruding machine having a 90 mm circular die, foamed sheets were prepared under the conditions shown in Table 1. As shown in Table 1, some foamed sheets were prepared with rubber added to a polymer of the styrene type, i.e., a polymer or copolymer of an aromatic vinyl monomer.

In Examples 1 to 24, the cells were burst by setting the extrusion temperature to 170° C. or more. Among Examples 1 to 24. Example 22 has concave portions of which the edges of the opening are not raised. In Examples 25 and 26, the cells were burst with wounds inflicted on the surface with sand paper of #400. In the foamed sheet of Example 23, talc having a grain size of 10 to 15 $\mu$m was added as a filler, whereas in the Example 24, calcium carbonate having a grain size of 10 to 15 $\mu$m was added as a filler. In all Examples, the sheets are made in a multi-layer structure having a foamed sheet and a non-foamed film laminated thereon. Except for the sheet of Example 4, the foamed sheet was laminated on the non-foamed film according to the co-extrusion method. In Example 4, polyethylene used as a film was laminated on a foamed polystyrene sheet with a vinyl acetate adhesive. There were used films and foamed sheets having various thicknesses as shown in Table 1—1. In Table 1, the number of concaves represents the number of concaves where the average size of the longitudinal size and the widthwise size is at least 50 $\mu$m.

Table 2 shows Comparative Examples, in which there was used a heat-shrinkable sheet including a heat-shrinkable polystyrene foamed sheet having a continuous cell rate (percentage) of 19%, laminated on a polystyrene film (Comparative Example 1). In Comparative Example 1, HYDOROCEROL (foaming agent manufactured by Boehringer Ingerheim in West Germany) and butane were used as foaming agents. However, since the cells in the foamed surface were burst at the time of extrusion, a film having a thickness of 10 $\mu$m was laminated on the foamed surface in order to eliminate the influence exerted by such burst cells.

Further, as Comparative Examples, there were used a bottle not covered with a heat-shrinkable sheet (Comparative Example 2), a bottle covered with a non-foamed heat-shrinkable film (Comparative Example 3), and bottles covered with a conventional heat-shrinkable sheet in which a heat-shrinkable polystyrene foamed sheet is laminated on a film of polystyrene according to the co-extrusion method and in which the foamed surface of the polystyrene foamed sheet is not made in a convexo-concave surface (Comparative Examples 4 and 5).

Table 1—1 and Table 2-1 show respectively the structures and the like of the heat-shrinkable sheets of the Examples and Comparative Examples.

The evaluations of the respective samples are put through the following procedures.

Shrinkage factor: The heat-shrinkable sheets were heat-shrunk at 130° C. for 15 seconds and calculations were made based on the lengths of the sheets before and after shrinkage.

Impact Resistance: Cylindrical glass bottles (diameter:67.5 mm, the size in the axial direction: 85 mm) having a capacity of 300 cc charged with water were dropped onto an iron plate from various heights to obtain the average height at which the bottles were broken, as an index of resistance to impact. Twenty bottles were used for each example of the Examples and Comparative Examples.

Tear by shower: The heat-shrinkable sheets were checked for presence or absence of tear after water had been blown under a pressure 2 kg/cm$^2$ from a nozzle having a diameter of 3.5 mm directed to the upper ends of the heat-shrinkable sheets covering the containers.

Dryness of moisture: After the heat-shrinkable sheets covering containers had been immersed in hot water of 90° C. for 20 minutes, the sheets were left as they are and the time required for drying the residual moisture in the foamed sheets was measured. Evaluations were based on the drying time. That is, examples for which a drying time less than 6 hours was required, are represented by ⊙, examples having a drying time of 6 hours to less than 12 hours are represented by ○, and examples having a drying time of 12 hours or more are represented by X.

Printability: The printability was judged by a photogravure printing. The mark ⊙ represents "very good", the mark ○ represents "good" and the mark X represents "bad".

The symbols in Tables 1 and 2 represent the following materials. Further, the term "PS+rubber 3% (6%)" in the column of Composition of Foamed Sheet Resin means that the foamed sheet was prepared with a styrene-butadiene block copolymer added to PS such that the sheet contains 3% by weight or 6% by weight of rubber.

| | |
|---|---|
| PS: Polystyrene | |
| PB: Polybutadiene-styrene block copolymer | |
| C$_4$: Butane, | F$_{12}$: Freon 12 |
| CO$_2$: Carbon dioxide gas | |
| M: Methylene chloride | HN: Sodium bicarbonate |
| HY: HYDOROCEROL | CA: Citric acid |

Under the conditions above-mentioned, the heat-shrinkable sheets of the Examples and Comparative Examples were checked for impact resistance, temperature rise characteristics of the water filled in bottles and others. Tables 1-2 and 2—2 show the results.

As apparent from Tables 1-2 and 2—2, in the Comparative Examples, the heat-shrinkable sheets excellent in impact-resistance (cushioning properties) do not have good characteristics of the rise of temperature and vice versa. Thus, a heat-shrinkable sheet excellent in the both characteristics was not obtained. As to the rise of temperature in 20 minutes, the containers covered with heat-shrinkable sheets having a convexo-concave foamed surface formed by bursting the cells in the foamed surface, were raised to higher temperatures as compared with the conventional heat-shrinkable sheets of the Comparative Examples 4 and 5. It is also found that such heat-shrinkable sheets are excellent in impact-resistance and provide good protection to containers. As to the moisture dryness, such heat-shrinkable sheets are superior to the heat-shrinkable sheet having continuous cells of Comparative Example 1.

On the other hand, in order to assure a good printability, it is apparent that a heat-shrinkable sheet preferably has three or more cells in the thickness direction (see Example 16).

In order to prevent a heat-shrinkable sheet covering a container from being damaged due to shower at the time of washing, it is apparent that the heat-shrinkable sheet preferably has a thickness of 200 μm or less (see Examples 19, 21 and 28).

In order to assure better impact resistance, it is apparent that a heat-shrinkable sheet preferably has a thickness of 80 μm or more (see Example 18).

In order to improve the moisture dryness, it is apparent that two concave portions per 1 mm$^2$ preferably exist on the foamed surface (see Example 20).

It is apparent that containers using the heat-shrinkable sheets having concave portions of which the edges of the openings are raised, are heated to higher temperatures in 20 minutes than those for heat-shrinkable sheets having concave portions of which opening edges are not raised (see Example 22).

Figure 3:
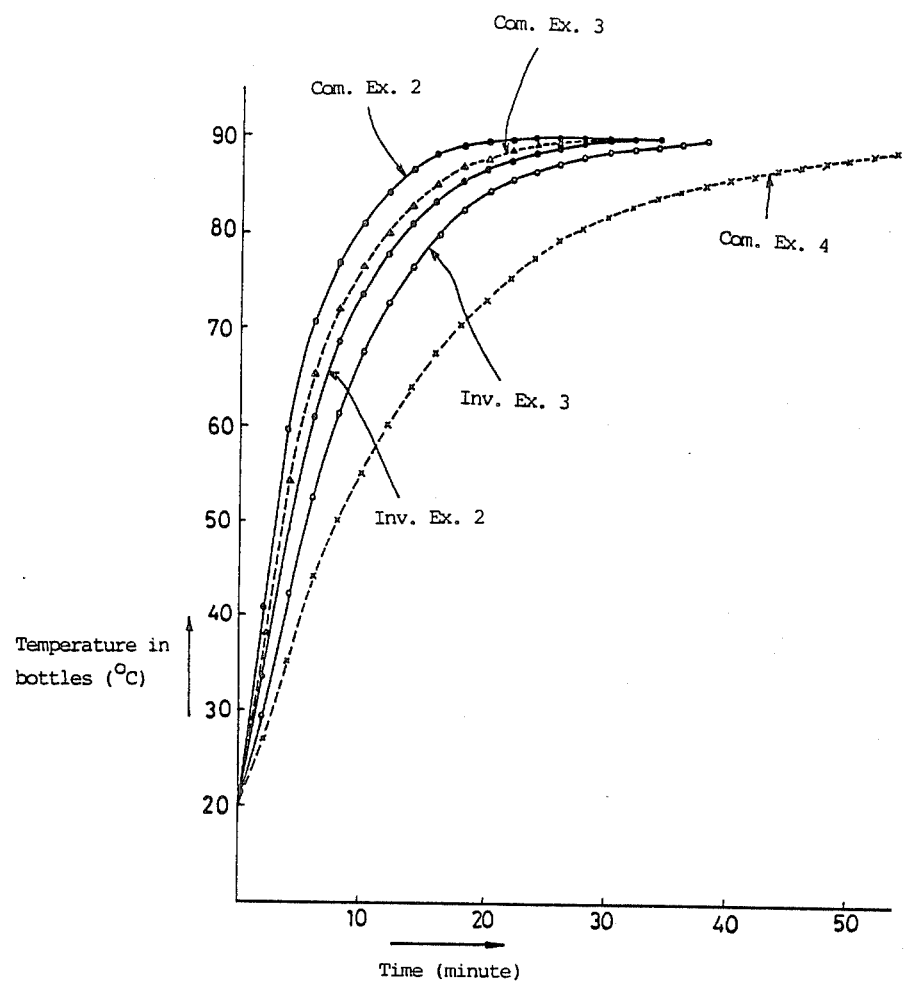
FIG. 3 is a graph showing the temperature rise characteristics of the samples described in the Examples and Comparative Examples.
Figure 4:
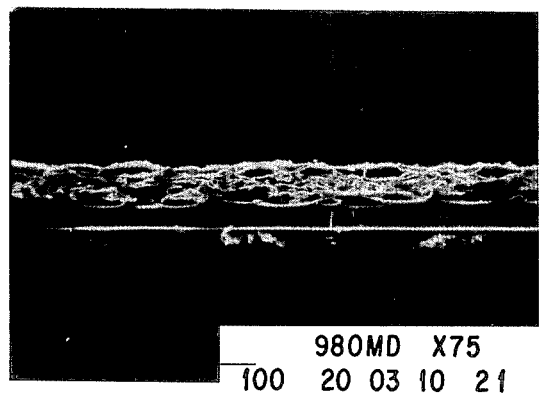
FIG. 4 is an electron microscope picture (photomicrograph) of a section of the heat-shrinkable sheet magnified 75 times.
Figure 5:
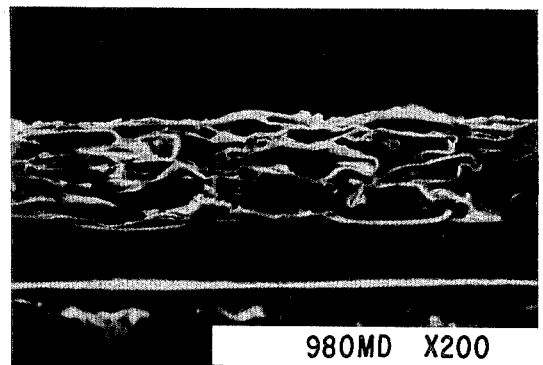
FIG. 5 is an electron microscope picture of a section of the heat-shrinkable sheet magnified 200 times.
Figure 6:
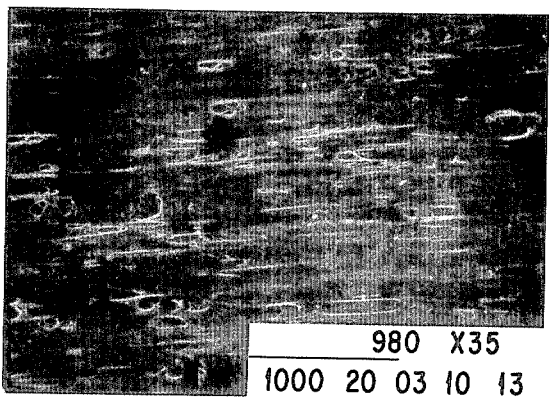
FIGS. 6 and 8 are electron microscope pictures of the foamed surface of the heat-shrinkable sheet magnified 35 times.
Figure 7:
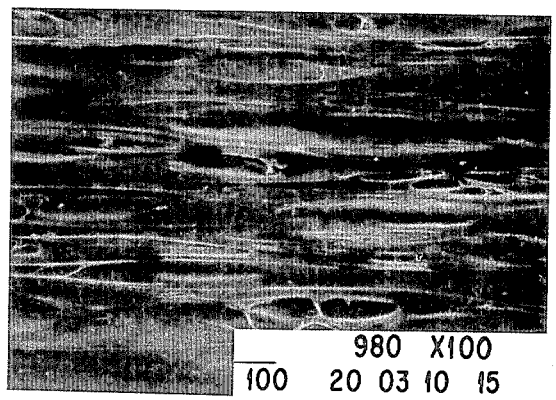
FIGS. 7 and 9 are electron microscope pictures of the foamed surface of the heat-shrinkable sheet magnified 100 times with the foamed surface inclined 40 degrees.

Bottles of capacity 300 cc closely covered with the heat-shrinkable sheets by heat shrinking and non-covered bottles of Comparative Example 3 shown in Table 1—1 were charged with water of 20° C. As the above-mentioned heat-shrinkable sheets, the heat shrinkable sheets of Examples 2 and 3 shown in Table 1—1 and those of Comparative Examples 3 and 4 shown in Table 2-1 were used. With these bottles immersed in hot water of 90° C., the temperatures of the water in the bottles were measured at regular time intervals and the characteristics of the rise of temperature were checked. FIG. 3 shows the results.

As apparent from FIG. 3, the rise speed of the temperature resulting from the use of the heat-shrinkable sheets of Examples 2 and 3 is faster as compared with that of Comparative Example 4.

As discussed hereinbefore, the heat-shrinkable sheet of the present invention has a convexo-concave foamed surface, which facilitates the entry of boiling water or cooling water between the surface of a container and the heat-shrinkable sheet when, with the convexo-concave foamed surface coming in contact with the surface of the container, the container is tightly covered with the heat-shrinkable sheet by heat shrinking. This enables efficient sterilization, thereby reducing the manufacturing cost of finished drink products.

By bursting the cells, the foamed surface of the heat-shrinkable sheet is made to have a convexo-concave surface, thus preventing the cushioning properties inherent in a foamed sheet from being lost to adequately protect a container.

Further, there is no danger of a large quantity of moisture penetrating the inside of the foamed layer, and the moisture which has penetrated the foamed surface can be dried in a short period of time through the burst cells. Therefore, even though containers covered with such heat-shrinkable sheets are packed as they are, no mold will be gathered, which is advantageous in view of hygiene.

TABLE 1-1

| Ex. | Extruding temp. (°C.) | Foaming agent | Composition of foamed sheet resin | Composition of film resin | Thickness Film (μm) | Thickness Foamed sheet (μm) | Thickness Total (μm) | Shrinkage factor Circumferential direction | Shrinkage factor Axial direction | Number of cells (thickness direction) | Number of concave portions per 1 m$^2$ |
|---|---|---|---|---|---|---|---|---|---|---|---|
| 1 | 185 | C$_4$ | PS | PS-type | 65 | 30 | 95 | 40 | 6 | 4 | 4 |
| 2 | 181 | " | PS + rubber 3% | " | 68 | 82 | 150 | 38 | 9 | 5 | 3 |
| 3 | 178 | " | PS + rubber 3% | " | 56 | 169 | 225 | 51 | 1 | 14 | 2 |
| 4 | 179 | " | PS + rubber 3% | PE | 33 | 122 | 155 | 47 | 3 | 6 | 3 |
| 5 | 189 | " | PS | PS-type | 49 | 32 | 81 | 45 | 9 | 3 | 2 |
| 6 | 193 | C$_4$ + F$_{12}$ | " | " | 43 | 42 | 85 | 47 | 10 | 4 | 5 |
| 7 | 191 | HY + C$_4$ | PS + rubber 6% | " | 51 | 36 | 87 | 42 | 9 | 12 | 10 |
| 8 | 191 | " | PS + rubber 6% | " | 55 | 96 | 151 | 46 | 8 | 7 | 8 |
| 9 | 190 | " | PS + rubber 6% | " | 59 | 101 | 160 | 43 | 6 | 8 | 9 |
| 10 | 187 | C$_4$ | PS | " | 62 | 94 | 156 | 42 | 6 | 8 | 3 |
| 11 | 195 | HY + HN + CA + C$_4$ | " | " | 61 | 136 | 197 | 36 | 2 | 15 | 12 |
| 12 | 190 | HN + CA + C$_4$ | " | " | 49 | 145 | 194 | 38 | 4 | 14 | 4 |
| 13 | 191 | C$_4$ | " | " | 56 | 142 | 198 | 37 | 4 | 8 | 6 |
| 14 | 192 | C$_4$ | " | " | 53 | 103 | 156 | 44 | 7 | 6 | 5 |
| 15 | 194 | C$_4$ + F$_{12}$ | " | " | 76 | 95 | 171 | 41 | 3 | 9 | 7 |
| 16 | 192 | HY + C$_4$ | PS + rubber 3% | " | 46 | 37 | 83 | 44 | 8 | 2 | 4 |
| 17 | 197 | " | PS + rubber 6% | " | 55 | 122 | 177 | 43 | 5 | 8 | 10 |
| 18 | 193 | C$_4$ + F$_{12}$ | PS | " | 45 | 30 | 75 | 46 | 10 | 4 | 5 |
| 19 | 193 | " | " | " | 61 | 155 | 216 | 37 | 3 | 14 | 9 |
| 20 | 191 | C$_4$ | " | " | 36 | 59 | 95 | 48 | 9 | 5 | 1 |
| 21 | 192 | HY + C$_4$ | " | " | 45 | 275 | 320 | 36 | 2 | 13 | 11 |
| 22 | 191 | C$_4$ | " | " | 48 | 43 | 91 | 46 | 9 | 6 | 2 |
| 23 | 190 | HY + C$_4$ | PP + filler 20% | PP | 60 | 120 | 180 | 41 | 8 | 5 | 3 |
| 24 | 185 | C$_4$ | PP + filler 25% | PP + PB | 50 | 136 | 186 | 45 | 7 | 6 | 4 |
| 25 | 167 | C$_4$ + F$_{12}$ | PS | PS-type | 61 | 88 | 149 | 39 | 9 | 5 | 18 |
| 26 | 163 | " | PS + | " | 21 | 295 | 316 | 46 | 3 | 11 | 21 |

TABLE 1-1-continued

| Ex. | Extruding temp. (°C.) | Foaming agent | Composition of foamed sheet resin | Composition of film resin | Thickness Film (μm) | Thickness Foamed sheet (μm) | Thickness Total (μm) | Shrinkage factor Circumferential direction | Shrinkage factor Axial direction | Number of cells (thickness direction) | Number of concave portions per 1 m² |
|---|---|---|---|---|---|---|---|---|---|---|---|
| | | | rubber 6% | | | | | | | | |

TABLE 1-2

| Ex. | Impact-resistance (cm) | Tear by shower | Rise of temp. in 20 minutes (°C.) | Moisture dryness | Printability |
|---|---|---|---|---|---|
| 1 | 40 | Absence | 87 | ○ | ○ |
| 2 | 44 | " | 86 | ○ | ○ |
| 3 | 48 | Presence | 84 | ○ | ⊙ |
| 4 | 43 | Absence | 81 | ○ | ○ |
| 5 | 38 | " | 86 | ○ | ○ |
| 6 | 37 | " | 87 | ⊙ | ○ |
| 7 | 37 | " | 87 | ○ | ⊙ |
| 8 | 41 | " | 86 | ⊙ | ○ |
| 9 | 42 | " | 86 | ⊙ | ○ |
| 10 | 40 | " | 84 | ○ | ⊙ |
| 11 | 44 | " | 84 | ○ | ⊙ |
| 12 | 45 | " | 83 | ○ | ⊙ |
| 13 | 45 | " | 83 | ⊙ | ○ |
| 14 | 40 | " | 83 | ⊙ | ○ |
| 15 | 39 | " | 84 | ⊙ | ○ |
| 16 | 37 | " | 87 | ⊙ | X |
| 17 | 40 | " | 86 | ⊙ | ○ |
| 18 | 36 | " | 87 | ⊙ | ○ |
| 19 | 46 | Presence | 82 | ○ | ⊙ |
| 20 | 39 | Absence | 85 | X | ⊙ |
| 21 | 47 | Presence | 85 | ○ | ⊙ |
| 22 | 38 | Absence | 83 | ○ | ○ |
| 23 | 46 | " | 86 | ○ | ○ |
| 24 | 43 | " | 84 | ○ | ○ |
| 25 | 41 | " | 85 | ⊙ | ○ |
| 26 | 53 | Presence | 83 | ⊙ | ⊙ |

TABLE 2-1

| Com. Ex. | Extruding temp. (°C.) | Foaming agent | Composition of foamed sheet resin | Composition of film resin | Thickness Film (μm) | Thickness Foamed sheet (μm) | Thickness Total (μm) | Shrinkage factor Circumferential direction | Shrinkage factor Axial direction | Number of cells (thickness direction) | Number of concave portions per 1 m² |
|---|---|---|---|---|---|---|---|---|---|---|---|
| 1 | 189 | HY + C₄ | PS + rubber 3% | PS-type | 24 | 291 | 315 | 55 | 2 | 11 | — |
| 2 | — | — | — | non-covered bottles | — | — | — | — | — | — | — |
| 3 | — | — | — | PS-type | 55 | — | — | 60 | 8 | — | — |
| 4 | 161 | C₄ | PS | " | 22 | 303 | 325 | 44 | 5 | 12 | 0 |
| 5 | 167 | " | " | " | 52 | 144 | 196 | 33 | 1 | 17 | 0 |

TABLE 2-2

| Com. Ex. | Impact-resistance (cm) | Tear by shower | Rise of temp. in 20 minutes (°C.) | Moisture dryness | Printability |
|---|---|---|---|---|---|
| 1 | 51 | Presence | 75 | X | ⊙ |
| 2 | 31 | — | 89 | — | — |
| 3 | 35 | Absence | 87 | ⊙ | ⊙ |
| 4 | 52 | " | 73 | ⊙ | ⊙ |
| 5 | 45 | " | 77 | ⊙ | ⊙ |

What is claimed is:

1. A heat-shrinkable sheet comprising a sheet of a foamed thermoplastic resin at least one side of which has a convexo-concave surface having convex and concave portions formed by opened cells or by opened cells and collapsed cells of the foamed sheet.

2. The heat-shrinkable sheet according to claim 1, wherein the convexo-concave foamed surface contains two or more concave portions per 1 mm² of surface area, the average of length and width of said concave portion being 50 μm or more.

3. The heat-shrinkable sheet according to claim 1, wherein the concave portions formed by open cells have raised edges around the opening.

4. The heat-shrinkable sheet according to claim 1, wherein the average number of cells in the thickness direction of the sheet is 3 to 15.

5. The heat-shrinkable sheet according to claim 1, wherein the sheet has a thickness of 80 to 200 μm.

6. The heat-shrinkable sheet according to claim 1, having a heat shrinkage factor of 35% or more in one direction and a heat shrinkage factor of 10% or less in a direction perpendicular to said one direction.

7. The heat-shrinkable sheet according to claim 1, wherein the concave portions of the convexo-concave foamed surface are discontinuous.

8. The heat-shrinkable sheet according to claim 1, wherein the foamed thermoplastic resin is selected from the group consisting of polystyrene, polyethylene and polypropylene.

9. The heat-shrinkable sheet according to claim 1, further comprising a non-foamed film laminated to said foamed thermoplastic resin sheet on the side opposite the side having the convexo-concave surface.

10. A container comprising a rigid substrate and, tightly contacting at least a portion of the outer surface of said substrate, a heat-shrunk sheet formed from a heat-shrinkable sheet comprising a foamed thermoplastic resin sheet, the side of which is in contact with said rigid substrate having a convexo-concave surface formed of open and/or collapsed cells of said foamed thermoplastic resin sheet.

* * * * *